United States Patent Office 3,113,333
Patented Dec. 10, 1963

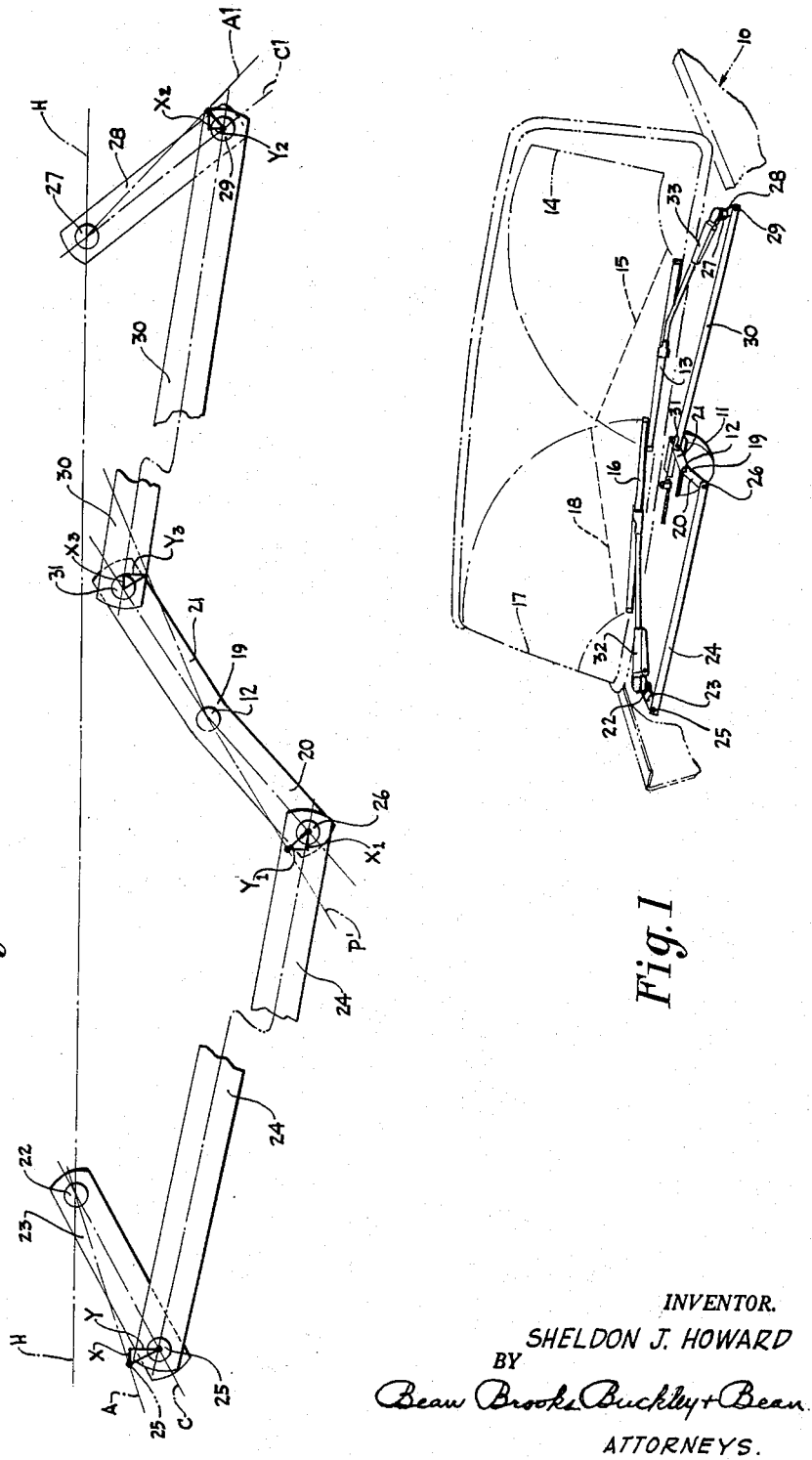

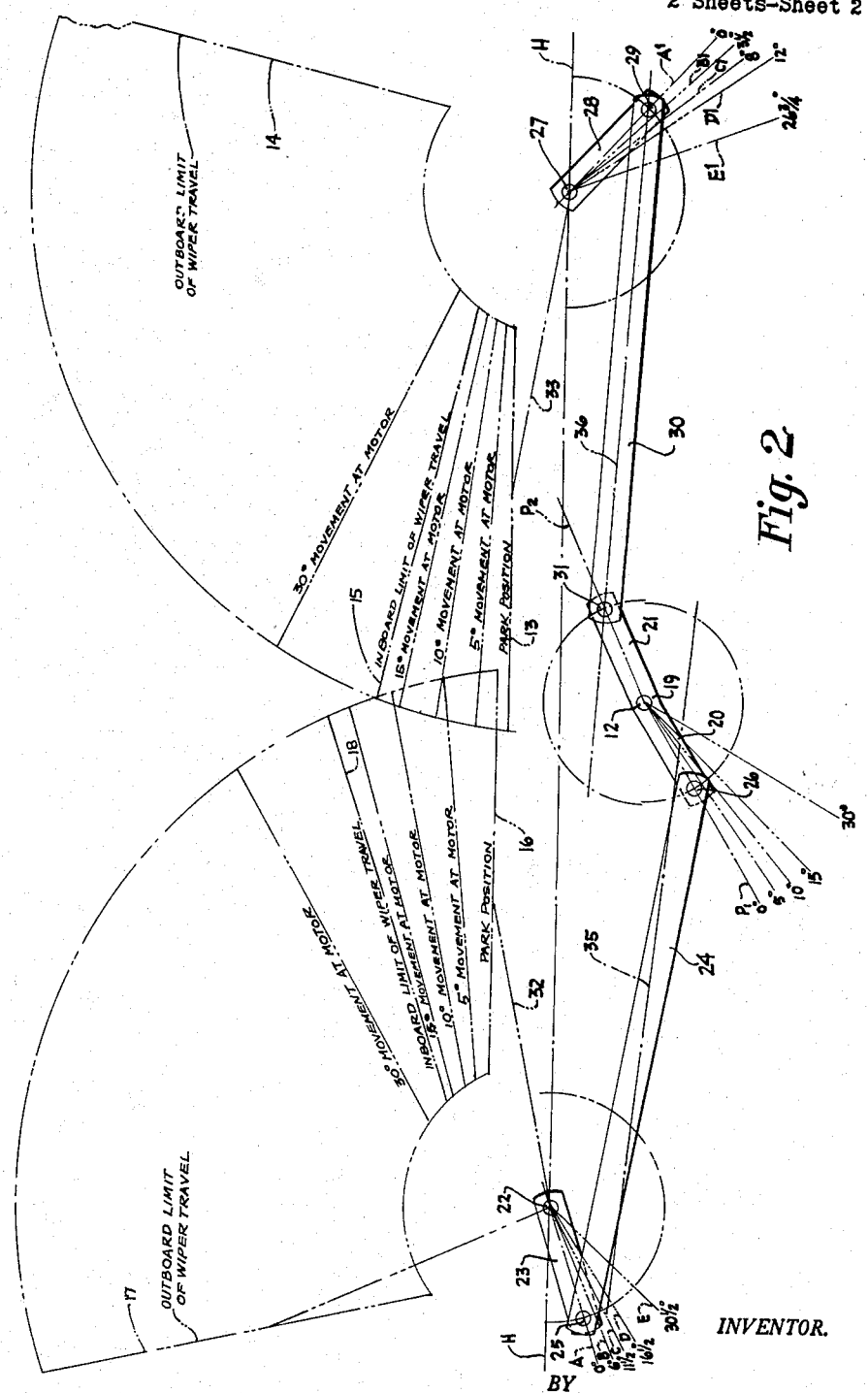

3,113,333
WINDSHIELD WIPER SYSTEM
Sheldon J. Howard, Buffalo, N.Y., assignor to Trico Products Corporation, Buffalo, N.Y.
Filed Apr. 25, 1961, Ser. No. 105,438
7 Claims. (Cl. 15—250.14)

The present invention relates to an improved linkage for a windshield wiper system.

It is the object of the present invention to provide a highly simplified windshield wiper linkage for use in a wiper system wherein the wipers travel in opposed relationship and park in parallel abutting relationship beyond their normal inboard limit of operation with one of the wipers lying above the other of the wipers, the linkage causing the upper wiper to travel from its parked position at a higher rate of speed than the lower wiper to thereby preclude the possibility of entangling engagement therebetween during the initial increments of movement of the wipers from their parked position. Other objects and attendant advantages of the present invention will readily be perceived hereafter.

The highly simplified linkage of the present invention which achieves the foregoing object includes a wiper motor having the usual drive shaft which drives a pair of pivots. The system also includes first and second rockshafts spaced on opposite sides of the wiper motor. The rockshafts carry first and second wiper arms, respectively, which in turn carry first and second wipers, respectively, the first wiper being positioned above the second wiper when the wipers are in a parked position. A first crankarm is mounted on the first rockshaft and a second crankarm is mounted on the second rockshaft. The first crankarm mounts a first pivot and the second crankarm mounts a second pivot. A first linkage extends between the first pivot on the first crankarm and one of the pivots at the motor and a second linkage extends between the second pivot on the second rockshaft and the other of the pivots at the motor. The foregoing highly simplified linkage causes the upper first wiper to travel at a greater speed from its parked position than the lower second wiper because of the orientation among the various pivots. More specifically, the various pivots are oriented in order to cause the ratio of the vertical component of movement of the first pivot to the vertical component of movement of the respective pivot at the other end of the first linkage from said first pivot to be greater than the ratio of vertical components of movement of the corresponding pivots associated with the second linkage. Because of the foregoing construction, a rapid pulling away of the upper wiper from the lower one is achieved during the initial increments of wiper movement from a parked position without any necessity for complex linkages for achieving the foregoing purposes. The present invention will be more fully understood when the following portions of the specification are read in conjunction with the accompanying drawings wherein:

FIG. 1 is a fragmentary perspective view of an automotive vehicle mounting the imrpoved highly simplified linkage of the present invention;

FIG. 2 is a schematic view showing the positions occupied by the various components of the system when the wiper motor is in a parked position and also showing the positions which the various components occupy for given amounts of movement at the wiper motor; and FIG. 3 is a schematic view showing the vertical components of movement of the various links of the wiper system during the first increments of motor travel.

In FIG. 1 an automotive vehicle 10 is shown having a wiper motor mounted thereon in the conventional manner. Motor 11 may be of the conventional vacuum type which causes the shaft 12 thereof to oscillate back and forth in a manner which is well known in the art. The connections for causing wiper motor 11 to operate and the specific details of the wiper motor itself are omitted in the interests of clarity. However, as is well understood in the art it will be appreciated that when the wiper motor 11 is in operation the lower wiper 13 will traverse a path bounded by lines 14 and 15 and the upper wiper 16 will traverse a path bounded by lines 17 and 18. However, when the wiper motor is caused to move to a parking position wipers 13 and 16 will move to their parked position shown in FIG. 1 wherein wiper 16 is in substantially parallel abutting relationship with, and lying higher than, wiper 13. As is also well known in the art the drive shaft 12 of motor 11 carries a drive lever 19 having a first portion 20 to one side of the drive shaft and a second portion 21 on the other side of the drive shaft. Suitably journalled for rotation in the cowl of the vehicle is a rockshaft 22 to which is fixedly secured a crankarm 23. An elongated link 24 extends in a substantially horizontal direction between a first pivot 25, such as a pin, located at substantially the end of crankarm 23 and another pivot 26, such as a pin, which is located at one end of lever portion 20 at the motor 11. Furthermore, a second rockshaft 27 is suitably journalled for rotation in the cowl of the vehicle and has a crankarm 28 secured thereto. A second pivot 29 is located substantially at the end of crankarm 28 and is secured to one end of elongated link 30, the other end of which is pivotally secured to portion 21 of lever 19 as by pin 31. Also mounted on rockshafts 22 and 27 are wiper arms 32 nad 33, respectively, which carry upper wiper 16 and lower wiper 13, respectively.

As noted above, it is the orientation of the various components of the highly simplified linkage described above which causes upper wiper 16 to move away from its parked position at a more rapid rate than lower wiper 13 to therefore preclude entangling engagement therebetween.

As can be seen from FIG. 2, wherein the components of structure bear the same numerals as noted above with respect to FIG. 1, when there are 5 degrees of counterclockwise movement of drive lever 19 from its parked position $P_1$ and $P_2$ there are 6 degrees of movement of crankarm 23 from its parking position A to position B. Accompanying such movement of crankarm 23 there are 3½ degrees of movement of crankarm 28 from its parking position $A^1$ to position $B^1$. The following table depicts the number of degrees of movement of crankarms 23 and 28 for a given number of degrees of movement of lever 19 in a given installation wherein the various linkages were oriented in accordance with the present invention:

| Degrees of Movement of Lever 19 at Motor from Parking Position | Position of Crankarm 23 | Position of Crankarm 28 | Degrees of Movement of Crankarm 23 from Position A | Degrees of Movement of Crankarm 28 from Position $A^1$ |
|---|---|---|---|---|
| 0 | A | $A^1$ | 0 | 0 |
| 5 | B | $B^1$ | 6 | 3½ |
| 10 | C | $C^1$ | 11¼ | 8 |
| 15 | D | $D^1$ | 16½ | 12 |
| 30 | E | $E^1$ | 30½ | 26¾ |

It will be appreciated that wiper arm 32, being mounted on rockshaft 22 with crankarm 23, moves the same number of degrees as crankarm 23 and that wiper arm 33 moves the same number of degrees as crankarm 28. The wiper carried by each of the wiper arms travels an angular amount, which is generally the same as the angular amount traveled by the wiper arm which carries it.

It will readily be appreciated that since upper wiper travels a greater number of degrees during its initial stages of movement in the same period that wiper 13 travels a lesser number of degrees, as can be seen from the above chart, upper wiper 16 pulls away from lower wiper 13 during such initial portions of movement to thereby preclude the above described entangling engagement between the wipers.

It will also be seen that crankarm 23, which drives the faster moving upper wiper 16, is positioned at a lesser angle to the horizontal H than is crankarm 28 which drives the lower wiper 13. In other words crankarm 23 is moved up "higher" on an arc about its center of rotation than is crankarm 28. The foregoing orientation causes crankarm 23 to have a greater amount of arcuate movement than crankarm 28 for the following reason: Link 24 is rigid, and as pivot 26, mounted thereon, moves a certain horizontal distance in response to the movement of motor 11, pivot 25, mounted at the other end of link 24, has to travel a corresponding amount. However, the movement of pivot 25 in a horizontal direction is controlled by the movement of crankarm 23 to which pivot 25 is attached. Since pivot 25, at the beginning of travel, is located at a substantially vertical portion of its arc of travel, it will have to travel through a relatively larger number of degrees on its arc of travel for a given horizontal movement of pivot 26 at the motor. Since pivot 29 of crankarm 28 is lower on the arc of movement of the crankarm, that is, on the more horizontal portion of the arc, a given horizontal movement of pivot 31 at the motor end of link 30 will produce less of an angular movement of pivot 29 because pivot 29 does not have to travel over a relatively long arc to cause its movement to correspond to the movement of pivot 31 at the motor.

The foregoing can be more readily appreciated from FIG. 3 wherein it can be seen that as crankarm 23 moves from its parked position A to position C it possesses a horizontal component of movement X and a vertical component Y for the movement of a given number of degrees of motor lever portion 20 having a horizontal component of movement $X_1$ and a vertical component of movement $Y_1$. Furthermore, it is to be noted that crankarm 28, in moving from its parked position $A^1$ to position $C^1$, has a horizontal component of movement $X_2$ and a vertical component $Y_2$. Furthermore, during the movement of the motor lever 19 the portion 21 thereof has a horizontal component of movement $X_3$ and a vertical component of movement of $Y_3$. In view of the foregoing orientation of the various linkages, the empirical relationship for providing a faster movement of the upper wiper as it pulls away from a parked position is that the ratio of the foregoing component of movement Y of crankarm 23 to the vertical component of movement $Y_1$ of motor lever portion 20 is greater than the ratio of the vertical component of movement $Y_2$ of crankarm 28 to the vertical component of movement $Y_3$ of motor lever portion 21.

In the present installation the rapid pullaway of the upper wiper 16 in addition to being achieved because the pivot 25 of crankarm 23 is at a higher position on its arc than pivot 29 on crankarm 28, is also achieved by virtue of the fact that pivot 26 is at a lower position on its arc than pivot 31. More specifically, in the foregoing respect it will be seen that for any given number of degrees of movement at motor drive shaft 12, pivot 26, which lies more along the horizontal portion of the arc than does pivot 31, will have a greater horizontal component of movement $X_1$ than is experienced by pivot 31, namely, the amount $X_3$. In other words, at motor starting, pivot 26, lying on the more horizontal portion of the arc than pivot 31, will have a greater horizontal movement than pivot 31. Since links 24 and 30 are rigid, the ends thereof at the crankarms will have to provide a movement which follows the movement at the motor but is governed by the action of the crankarms to which they are attached. Thus, the greater the horizontal component of movement of the pivots at the motor the greater will be the amount of arcuate travel of the pivots at the crankarms, assuming that the pivots at the motor are located on a more vertical portion of the arc than are the pivots at the motor. In other words, the relationship which can describe the faster pullaway is the above relationship which sets forth the ratios between the vertical components of movement of the pivot at the crankarms with respect to the vertical components of movement at the motor.

The foregoing orientation of the various components of the wiper system to provide the above described results can be visualized in another manner, namely, with respect to the "balance line" of the wiper set. The balance line, by definition, is that line which is determined by the end positions of travel of the crankarm and the motor lever which drives the crankarm. In other words, the end positions of pivot 25 of crank arm 23 will lie on the same straight line on which the end positions of pivot 26 of motor level portion 20 lie. The same relationship exists between pivots 29 and 31 of link 30 when the wiper set is in balance. A balanced set will cause the wipers to travel in substantially the same manner. The balance line for crankarm 23 and motor lever portion 20 is denoted by numeral 35 and the normal balance line for pivots 31 and 29 is denoted by numeral 36. In order to achieve the objects of the present invention it can readily be seen that crankarm 23 is moved clockwise an amount of 15 degrees from the point of intersection of balance line 35 with the arc of travel of pivot 25 to cause the latter to lie higher upon the arc than pivot 29 which in the parked position lies on the balance line 36. Furthermore, as noted above, to accentuate the differences in rate of travel between wiper 16 and wiper 13, pivot 26 on the portion 20 of motor lever 19 is moved 10 degrees from the point of intersection of the normal balance line 35 and the arc of travel of pivot 26 to lie on the more horizontal portion of the arc of travel, whereas pivot 31 lies directly on the balance line 36 at its end portion of travel. It can thus be seen that by unbalancing a wiper set by offsetting various of the pivots from the normal balance line associated therewith, a higher rate of speed may be imparted to an overlaying wiper to cause it to pull away from a parked position more rapidly than the lower wiper and thereby avoid any entangling engagement therebetween. It will readily be appreciated that the rapid pullaway may also be achieved by offsetting crankarm 28 and lever portion 21 in an opposite direction than described above with respect to crankarm 23 and lever portion 20. In other words, substantially the same result may be achieved by causing lever portion 21 to lie more toward the horizontal and crankarm 28 to lie closer to the vertical, assuming that crankarm 23 and lever 20 were not moved off of the balance line 35. Furthermore, the rapid pullaway may be accentuated by offsetting both crankarms and their associated lever portions in an appropriate manner with respect to their respective balance lines. For example, in addition to offsetting crankarm 23 and lever portion 20 with respect to balance line 35 as shown, crankarm 28 may be moved clockwise so that pivot 29 lies below the balance line and pivot 31 may also be moved to lie below the balance line. In the latter instance, crankarm 23 would travel faster than if it were balanced and crankarm 28 would travel slower than if it were balanced.

It can thus be seen that the linkage of the present invention is manifestly capable of achieving the above enumerated objects and providing the above discussed advantage by the use of extremly simple structure and, while a preferred embodiment of the present invention is disclosed, it will readily be appreciated that the present invention is not limited thereto but may be otherwise embodied within the scope of the following claims.

What is claimed is:

1. A windshield wiper linkage for driving a pair of windshield wipers in opposed relationship which are adapted to park in substantially parallel relationship on the central portion of the windshield with one wiper lying above the other wiper, comprising a wiper motor having a drive shaft adapted to provide oscillatory motion, a motor lever having its central portion affixed to said drive shaft and having a first lever portion lying to one side of said drive shaft and a second lever portion lying to the other side of said drive shaft, a first rockshaft mounted for pivotal movement proximate the lower margin of said windshield to one side of said wiper motor and spaced therefrom, a second rocketshaft mounted for pivotal movement proximate the lower margin of said windshield and positioned on the other side of said wiper motor and spaced therefrom, a first wiper arm mounted on said first rockshaft, a second wiper arm mounted on said second rockshaft, a first wiper mounted on said first wiper arm, a second wiper mounted on said second wiper arm, a first crankarm mounted on said first rockshaft, a second crankarm mounted on said second rockshaft, a first elongated link extending generally in a horizontal direction and pivotally mounted at one end thereof on said first motor lever portion and pivotally mounted at the other end thereof to said first crankarm, a second elongated link extending generally in a horizontal direction and pivotally mounted at one end thereof on said second lever portion and pivotally mounted at the other end thereof to said second crankarm, said first crankarm being oriented with respect to said first lever portion and said second crankarm being oriented with respect to said second lever portion so that the ratio of the vertical component of movement of said first crankarm to the vertical component of movement of said first lever portion is greater than the ratio of the vertical component of movement of said second crankarm with respect to the vertical component of movement of said second lever portion for a given number of degrees of movement of said drive shaft when said wiper motor causes said first and second wipers to start up from a parked position whereby said first wiper travels at a greater rate of speed than said second wiper during such initial portion of movement to thereby tend to prevent said second wiper from engaging said first wiper and interlocking therewith.

2. A windshield wiper linkage as set forth in claim 1 wherein said first portion of said motor lever has a first axis and wherein said second portion of said motor lever has a second axis and wherein said first axis is offset from said second axis so that said first portion of said motor lever has a greater component of movement in a horizontal direction than said second portion of said motor lever during the initial portion of motor movement from a parked position.

3. A windshield wiper linkage for driving a pair of windshield wipers in opposed relationship through a first range of movement when said wipers are being utilized to clear moisture from a windshield and which causes the wipe patterns of said wipers to overlap and causes the wipers to park in substantially parallel relationship with one wiper lying above the other wiper at a position which is an extension from said first range of movement comprising a wiper motor having a drive shaft, a motor lever having its central portion attached to said drive shaft and having a first lever portion lying to one side of said drive shaft and a second lever portion lying to the other side of said drive shaft, a first rockshaft mounted for pivotal movement proximate the lower margin of said windshield and spaced on one side of said wiper motor, a second rockshaft mounted for pivotal movement proximate the lower margin of said windshield and positioned on the other side of said wiper motor and spaced therefrom, a first wiper arm mounted on said first rockshaft, a second wiper arm mounted on said second rockshaft, a first wiper mounted on said first wiper arm, a second wiper mounted on said second wiper arm, a first crank arm mounted on said first rockshaft, a second crankarm mounted on said second rockshaft, a first elongated link extending generally in a horizontal direction and pivotally mounted at one end thereof to said first lever portion and pivotally mounted at the other end thereof to said first crankarm, a second elongated link extending generally in a horizontal direction and pivotally mounted at one end thereof to said second lever portion and pivotally mounted at the other end thereof to said second crankarm, said first lever portion having a first axis which is offset from the axis of said second lever portion so that said first lever portion has a greater component of movement in a horizontal direction than said second lever portion during the initial portion of motor movement from a parked position to thereby cause said first wiper which lies above said second wiper when said wipers are parked to have a greater velocity than said second wiper during the initial portion of wiper travel from a parked position.

4. A windshield wiper linkage for driving a pair of windshield wipers in opposed relationship with their wipe patterns overlapping at their terminal portions of movement prior to their coming to rest in a parked position with one wiper overlaying the other comprising a wiper motor having a drive shaft, drive lever means attached to said drive shaft, a first pivot mounted on said drive lever means on one side of said drive shaft and a second pivot mounted on said drive lever means on the other side of said drive shaft, first and second rockshafts mounted for pivotal movement on opposite sides of said wiper motor, first and second wiper arms mounted on said first and second rockshafts, respectively, first and second wipers mounted on said first and second wiper arms, respectively, first and second crankarms mounted on said first and second rockshafts, respectively, a third pivot mounted on said first crankarm, a fourth pivot mounted on said second crankarm, a first elongated link having one end thereof mounted on said third pivot and the other end thereof mounted on said first pivot, a second elongated link having one end thereof mounted on said fourth pivot and the other end thereof mounted on said second pivot, said first and second elongated links extending generally in a horizontal direction, said third pivot being oriented with respect to said first pivot so that the ratio of the component of vertical movement of said third pivot to the component of vertical movement of said first pivot is greater than the ratio of the component of vertical movement of said fourth pivot with respect to the component of vertical movement of said second pivot for a given number of degrees of movement of said drive shaft when said wiper motor causes said first and second wipers to start up from a parked position whereby said first wiper travels at a greater rate of speed than said second wiper during such initial portion of movement to thereby tend to prevent said second wiper from engaging said first wiper and interlocking therewith.

5. A windshield wiper linkage for driving a pair of windshield wipers in opposed relationship from a parked position wherein said wipers lie substantially parallel to each other at the bottom edge of a windshield with the first of said wipers overlaying the second of said wipers, comprising a wiper motor, a drive shaft driven by said wiper motor, a drive lever mounted in driving relationship with said drive shaft, said drive lever having a pivotal axis and a first drive lever portion extending to one side of said pivotal axis and a second drive lever portion extending to the other side of said pivotal axis, first and second rockshafts located on opposite sides of said drive lever, first and second wiper arms mounted on said first and second rockshafts, respectively, said first and second wipers being mounted on said first and second wiper arms, respectively, first and second crankarms mounted on said first and second rockshafts, respectively, first and second pivots mounted on said first and second crankarms, respectively, third and fourth pivots mounted on said first and second drive lever portions, respectively, first linkage means extending between said first and third pivots, second linkage means extending between said second and fourth pivots, said first pivot being oriented with respect to said third pivot and said second pivot being oriented with respect to said fourth pivot so that the ratio of the vertical component of movement of said first pivot to the vertical component of movement of said third pivot is greater than the ratio of the vertical component of movement of said second pivot to the vertical component of movement of said fourth pivot for a given number of degrees of movement of said drive lever when said wiper motor causes said first and second wipers to start up from a parked position whereby said first wiper travels at a greater rate of speed than said second wiper during such initial portion of movement to thereby tend to prevent said second wiper from engaging said first wiper and interlocking therewith.

6. A windshield wiper linkage for driving a pair of windshield wipers in opposed relationship from a parked position wherein said wipers lie substantially parallel to each other at the bottom edge of a windshield with the first of said wipers overlaying the second of said wipers, comprising an oscillating wiper motor, an oscillating drive shaft driven by said wiper motor, drive lever means coupled to said drive shaft, first and second rockshafts mounted on said vehicle, first and second wiper arms mounted on said first and second rockshafts, respectively, said first and second wipers being mounted on said first and second wiper arms, respectively, first and second crankarms mounted on said first and second rockshafts, respectively, linkage means extending between said drive lever means and said first and second crankarms, said drive lever means having portions on both sides of said drive shaft, the axis of one of said portions being offset from the axis of the other of said portions so that the axis of the portion coupled to the first crankarm lies closer to the vertical than the axis of the portion coupled to said second crankarm, said first crankarm being positioned at a smaller angle to the horizontal than said second crankarm when said wipers are proximate said parked position whereby said first crankarm travels through a greater angular distance than said second crankarm for a given number of degrees of movement of said drive shaft when said wiper motor causes said first and second wipers to start up from a parked position whereby said first wiper travels at a greater rate of speed than said second wiper during such initial portion of movement to thereby tend to prevent said second wiper from engaging said first wiper and interlocking therewith.

7. A windshield wiper linkage for driving a pair of windshield wipers in opposed relationship from a parked position wherein said wipers lie substantially parallel to each other at the bottom edge of a windshield with the first of said wipers overlaying the second of said wipers, comprising a wiper motor, a drive shaft driven by said wiper motor, a drive lever mounted in driving relationship with said drive shaft, said drive lever having a pivotal axis and a first drive lever portion extending to one side of said pivotal axis and a second drive lever portion extending to the other side of said drive lever portion, first and second rockshafts journalled in said vehicle, first and second wiper arms mounted on said first and second rockshafts, respectively, said first and second wipers being mounted on said first and second wiper arms, respectively, linkage means operatively coupling said first and second drive lever portions to said first and second rockshafts, respectively, said first drive lever portion being at a closer angle to the vertical than said second drive lever portion to thereby cause said first wiper to travel through a greater number of degrees of movement than said second wiper for a given number of degrees of movement of said drive shaft when said wiper motor causes said first and second wipers to start up from a parked position to thereby tend to prevent said second wiper from engaging said first wiper and interlocking therewith.

References Cited in the file of this patent

UNITED STATES PATENTS

| 2,608,707 | Oishei | Sept. 2, 1952 |
| 3,025,552 | Constant | Mar. 20, 1962 |

FOREIGN PATENTS

| 853,835 | Great Britain | Nov. 9, 1960 |